United States Patent [19]
Fujii et al.

[11] Patent Number: 4,759,320
[45] Date of Patent: Jul. 26, 1988

[54] INTAKE DEVICE FOR AN INTERNAL COMBUSTION ENGINE

[75] Inventors: Takaaki Fujii; Seishi Miura, both of Niiza; Takaaki Tsukui, Tokyo, all of Japan

[73] Assignee: Honda Giken Kogyo Kabushiki Kaisha, Tokyo, Japan

[21] Appl. No.: 81,133

[22] Filed: Aug. 3, 1987

[30] Foreign Application Priority Data

Aug. 6, 1986 [JP] Japan ................. 61-185616
Dec. 28, 1986 [JP] Japan ................. 61-309961

[51] Int. Cl.⁴ ........................................... F02B 75/18
[52] U.S. Cl. ............................. 123/52 M; 123/52 MB
[58] Field of Search ......... 123/52 M, 52 MB, 52 MC, 123/52 MV

[56] References Cited

U.S. PATENT DOCUMENTS

| | | | |
|---|---|---|---|
| 3,875,918 | 4/1975 | Loynd | 123/52 M |
| 4,497,286 | 2/1985 | Masuda | 123/52 M |
| 4,543,918 | 10/1985 | Ma | 123/52 MB |
| 4,545,331 | 10/1985 | Ito et al. | 123/52 M |
| 4,546,733 | 10/1985 | Fukami et al. | 123/52 MB |
| 4,565,166 | 1/1986 | Takeda | 123/52 MB |
| 4,574,748 | 3/1986 | Inoue et al. | 123/52 MB |
| 4,664,076 | 5/1987 | Miyano et al. | 123/52 MB |

FOREIGN PATENT DOCUMENTS 0213921 12/1984 Japan ................. 123/52 MB

Primary Examiner—Charles J. Myhre
Assistant Examiner—David A. Okonsky
Attorney, Agent, or Firm—Birch, Stewart, Kolasch & Birch

[57] ABSTRACT

The present invention relates to an intake device for an internal combustion engine mounted on motorcycles or other various vehicles. The intake device comprises an air flow resistance adjusting mechanism for adjusting the air flow resistance in an intake passage in linkage with a variable intake pipe length mechanism to provide an excellent optimum air/fuel ratio over the entire speed range of the internal combustion engine. The variable intake pipe length mehcanism comprises a stationary intake pipe connected to a carburetor, a guide pipe separated from the stationary intake pipe, and a movable intake pipe slidably mounted on the guide pipe so tat the movable intake pipe is capable of coming in contact with or being spaced from the stationary intake pipe in response to the engine revolving speed. The movable intake pipe is connected to the stationary intake pipe below the predetermined engine speed and separated from it above the predetermined engine speed. The air flow resistance adjusting mechanism comprises a case adapted to enclose the stationary intake pipe, the movable intake pipe and the guide pipe, and having an intake passage communicating with the atmosphere and a mechanism for varying the air flow resistance of the intake passage in response to the switching motion of the movable intake pipe.

9 Claims, 18 Drawing Sheets

INTAKE DEVICE FOR AN INTERNAL COMBUSTION ENGINE

BACKGROUND OF THE INVENTION (1) Field of the Invention

The present invention generally relates to an intake device for an internal combustion engine mounted on motorcycles and various vehicles. More particularly, the present invention relates to a specific type intake device provided with a variable intake pipe length mechanism and an intake vacuum adjusting means.

(2) Description of the Prior Art

It is well known to one skilled in the art that an internal combustion engine is provided with a variable intake pipe length mechanism to vary the intake pipe length. Such mechanism has been designed so as to adjust the intake pipe length to be long during the low revolution speed of the engine or to be short during the high speed. In addition to this mechanism the engine has been combined with a variable fuel control type carburetor as taught by Japanese Patent Application Open-Publication No. Sho. 61-49124.

In order to facilitate a better understanding of the prior art, the effects and functions of the variable pipe length mechanism in compensating the air/fuel ratio will be explained in conjunction with FIGS. 18 to 21.

FIG. 18 shows two performance curves representing the relation between the engine speed and the power generated by the engine, one is where the engine is provided with a combination of a long intake pipe and an optimum carburetor. A (combination A), and the other is where the engine is provided with a combination of a short intake pipe and an optimum carburetor B (combination B). These curves cross at a specific engine speed Nex. Assuming that this cross point, Nex, is used as a boundary point, an ideal performance will be achieved if the engine with the combination A is operated for a low engine speed zone from zero to the boundary point Nex and the engine is then B operated with the combination for a high engine speed zone above than the boundary point Nex.

FIG. 19 shows the relation between the engine speed and the required flow quantity for the combination A and Fig. 20 shows the relation between the engine speed and the required flow quantity for the combination B. In these figures, the straight line I represents an air/fuel ratio required to operate an internal combustion engine ideally regardless of the intake pipe length.

When one carburetor, for example the carburetor B, is used for executing its combustion control, the performance curve C shown in FIG. 21 is plotted. This curve C is identified with the line I in the high speed range above the boundary point Nex and while the curve C is shifted to the poor side of the air fuel ratio in the low speed range. This fact means that the engine provided with only the variable intake pipe length mechanism cannot always apply to every driving condition. In order to compensate this fact the engine is further provided with a variable fuel adjusting type carburetor so as to enrich the air/fuel ratio.

However, the variable fuel adjusting type carburetor requires a complicated structure and causes a time delay for generating the compensating effect after switching the fuel control device such as a main jet to adjust its air/fuel ratio.

As the intake pipe length is increased, the inertia effect is also enlarged and remarkable pulsating wave of air flow is generated in the intake pipe. FIG. 22 shows the influence of the pulsating wave applied to a main nozzle N of the carburetor. As an intake valve V makes an intake port IN alternatively open or close, the pulsating wave is alternatively applied in the positive or negative direction to the main nozzle N. The total area of the negative pulsating wave is represented by $\Sigma M$ and the total area of the positive pulsating wave is represented by $\Sigma P$. The fuel can be smoothly sucked out of the main nozzle N as long as the difference between these areas is kept within the following condition.

$$\Sigma P - \Sigma M < 0 \text{ ($\Sigma P$ and $\Sigma M$ are absolute values)}$$

However, as the difference approaches zero the sucked fuel quantity is decreased, so that the air/fuel ratio also fluctuates.

BRIEF SUMMARY OF THE INVENTION

It is an object of the present invention to provide an intake device for an internal combustion engine with an improved compensating means for an air/fuel ratio.

Another object of the present invention is to provide an intake device for an internal combustion engine with an improved compensating means for an air/fuel ratio instead of the variable fuel adjusting type carburetor or the auxiliary compensating means thereof.

A further object of the present invention is to provide an intake device for an internal combustion engine with a relatively simple structure which can compensate the pulsating wave generated by the variable intake pipe length mechanism.

To accomplish the above mentioned objects, the intake device for an internal combustion engine according to the present invention is characterized as follows. An an intake device having a variable intake pipe length mechanism which comprises a stationary intake pipe connected to a carburetor, a guide pipe separated from the stationary intake pipe, and a movable intake pipe slidably mounted on the guide pipe so as to be capable of switching on and off with respect to the stationary intake pipe in response to the engine's revolving speed, so that the movable intake pipe is connected to the stationary intake pipe below the predetermined engine speed and separated from it above the value, where the improvement comprises a case enclosing the stationary intake pipe, the movable intake pipe, and the guide pipe and having an intake passage integrally formed therewith and in communication with the atmosphere; and a vaccum pressure adjusting means for varying the air flow resistance of the intake passage in response to the switching motion of the movable intake pipe.

Other and further objects and features of the present invention will become obvious upon an understanding of the illustrative embodiments about to be described or will be indicated in the appended claims, and various advantages not referred to herein will occur to one skilled in the art upon employment of the invention in practice.

DETAILED DESCRIPTION OF THE PREFERRED EMBODIMENT

Figure 21:
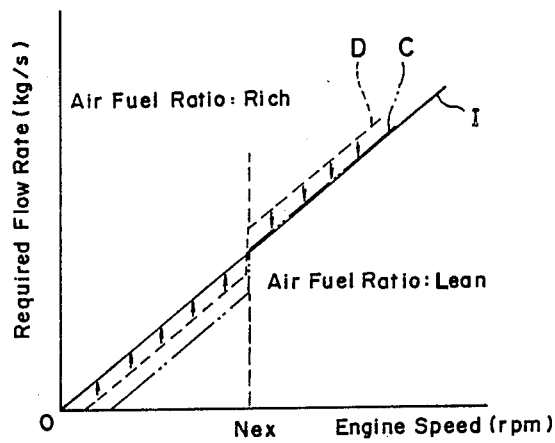
FIG. 21 is a graph showing the relationship between the variable intake pipe length mechanism short intake pipe and the required air flow rate.
Figure 22:
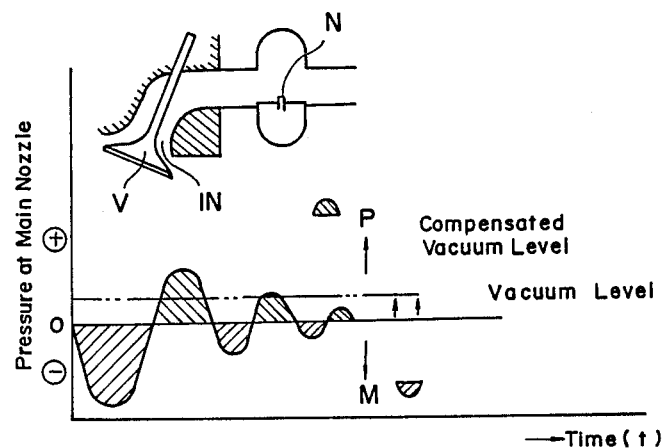
FIG. 22 is a graph showing the relationship between the pulsation and the vacuum pressure level.

In order to facilitate a better understanding of the present invention, the theory of this intake device will be explained with reference to FIGS. 21 and 22.

When the carburetor B is controlled so as to coincide with the air/fuel ratio of the line C shown in FIG. 21, the air/fuel ratio is shifted to the lean range in comparison with the line I in the low speed zone below the boundary point Nex as shown by the line D even when the intake pipe length is extended by the variable intake pipe length mechanism. Further, the long intake pipe also increases the inertia effect and generates severe pulsating waves. As the engine speed is shifted into the low speed zone from the boundary point, Nex, the air flow resistance in the intake pipe is increased by the air flow resistance adjusting means in linkage with the shifting operation for extending the intake pipe length. Then the vacuum pressure level at the main nozzle N is increased (the absolute value is increased) and the reference level is shifted to the positive range as represented by the phantom line in FIG. 22. Accordingly, the air/fuel ratio is shifted in the direction represented by the arrows so as to coincide the line D with the line I, and finally the air/fuel ratio is enriched for compensation. The main nozzle N is applied quickly with the change of the air flow resistance so that a good compensation response for the air/fuel ratio can be obtained. Even when the enlarged pulsating wave is applied to the main nozzle, the formula ($\Sigma P - \Sigma M$) is kept within the negative range and thus the fuel can be sufficiently sucked.

In the high speed zone above the boundary point, Nex, the movable intake pipe is shifted in the opposite direction as stated above so that the stationary intake pipe is isolated from the guide pipe. The pipe length is decreased and the air flow resistance is simultaneously decreased in response to the above motion. In accordance with this operation, line D is shifted to line I as represented by the arrows to compensate the air/fuel ratio to its optimum value.

If the carburetor is arranged at the long intake pipe, the adjusting operation of air flow resistance will be reverse in the above manner.

Figure 1:
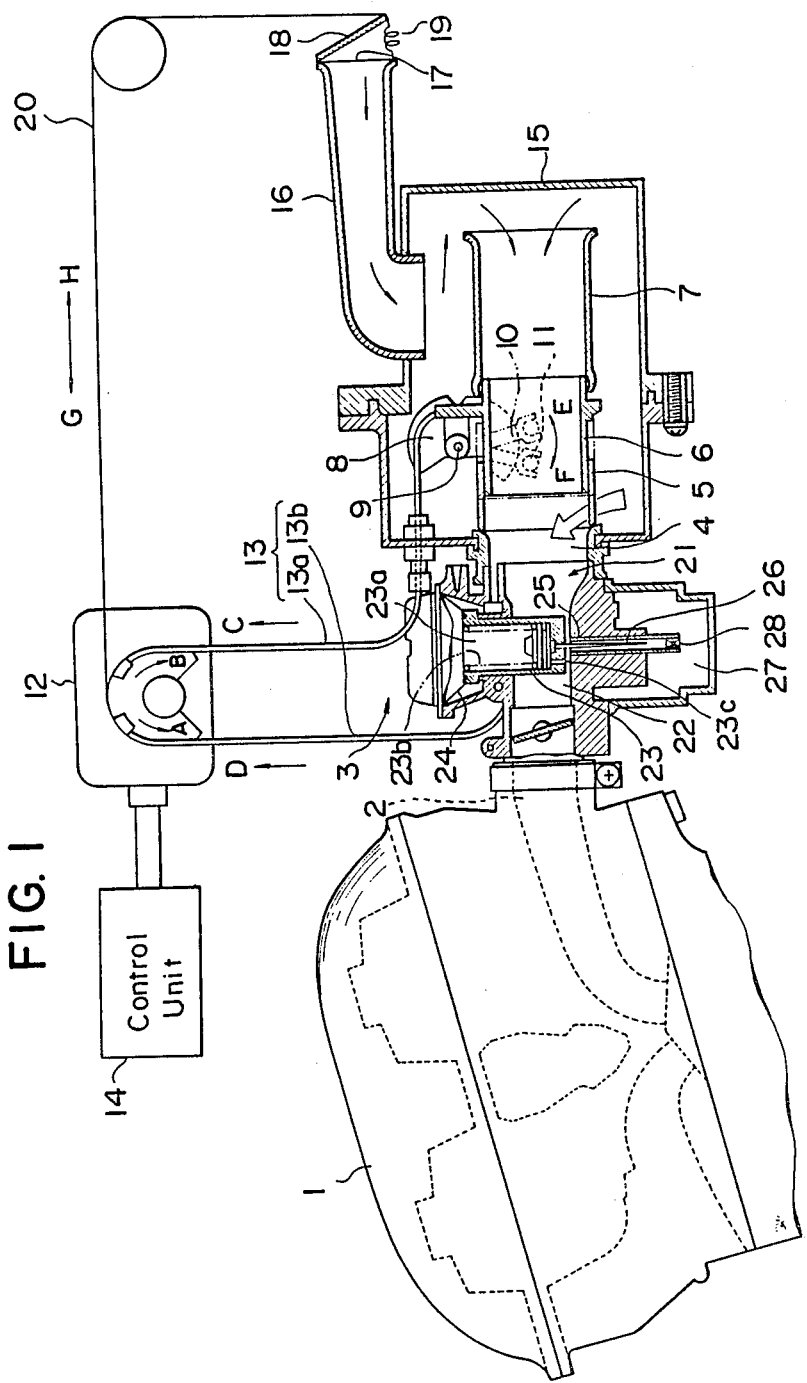
FIG. 1 is a schematic illustration showing a whole system of intake device for an internal combustion engine, which is equipped with the first embodiment of the intake device according to the present invention.
Figure 2:
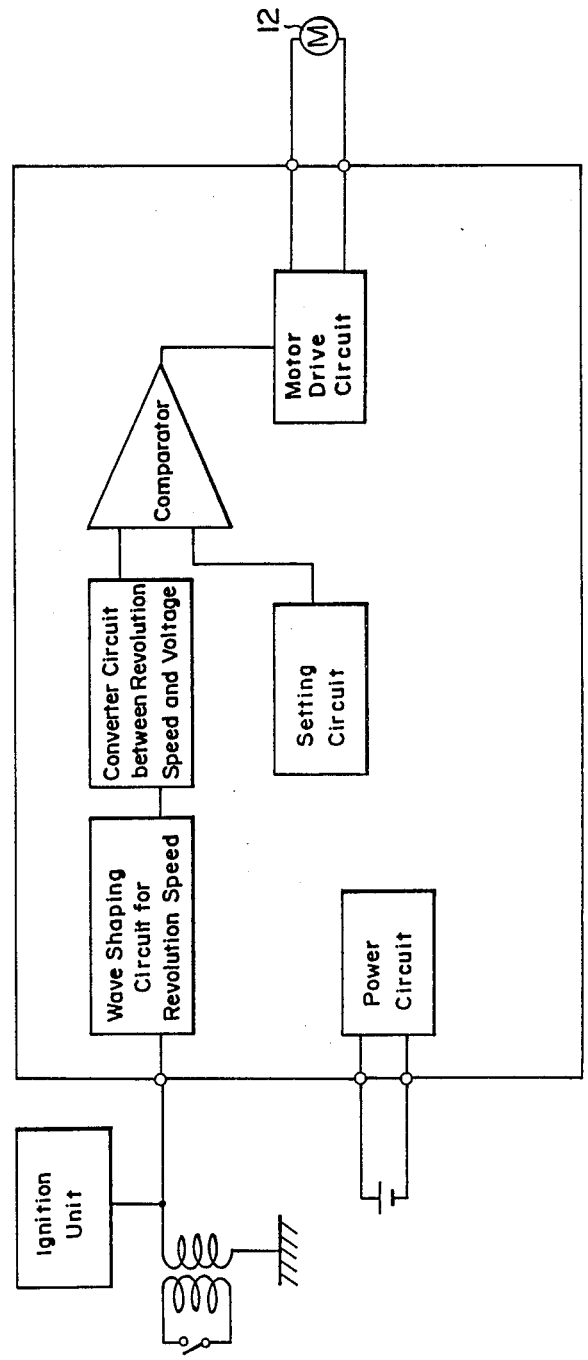
FIG. 2 is a block diagram for executing an electronic control for the variable intake pipe length mechanism and the air flow resistance adjusting means of the intake device shown in FIG. 1.

FIG. 1 to FIG. 2 show a first preferred embodiment according to the present invention which relates to an intake device for an internal combustion engine mounted on a motorcycle. This intake device is provided with a variable intake pipe length mechanism and a variable throttle mechanism which is one example of an air flow resistance adjusting means.

FIG. 1 shows a schematic illustration showing a system of the intake device. In the drawing, the reference numeral 1 denotes an internal combustion engine whose intake port 2 is connected to a carburetor 3. A variable intake pipe length mechanism is located in the upper stream of the carburetor 3. The variable intake pipe length mechanism is constituted by a stationary intake pipe 4, a movable intake pipe 5 and a guide pipe 6. The stationary intake pipe 4 is fixedly connected to the upper stream of the carburetor 3. The movable intake pipe 5 is arranged in a switching relation to the open end of the stationary intake pipe 4 and mounted on the periphery of the guide pipe 6. The upper stream end section of the guide pipe 6 forms a horn 7. The movable intake pipe 5 can be selectively shifted between the first position represented by the rigid line where it contacts with the open end of the stationary intake pipe 4 and the second position represented by the phantom line where it is isolated from the pipe 4.

An actuating mechanism for adjustably shifting the movable intake pipe 5 comprises a rotatable drum 8 pivotted on the guide pipe 6, a connecting element 10 integrally fixed to the rotatable shaft 9 of the drum 8 and having a U-shaped section at the tip thereof, an engageable projection 11 projected from the side portion of the movable intake pipe 5 and engaged with the U-shaped section, a servo motor 12, and a wire 13 connecting the output shaft of the servo motor 12 to the rotatable drum 8. The wire 13 is composed of a pair of wires 13a and 13b. One end of each wire is fixed to the output section of the servo motor 12 and the other end is fixed to the opposite portion of the rotatable drum 8 in respect to the rotatable shaft 9. According to this arrangement, the wire 13a or the wire 13b is selectively pulled by the servo motor 12 in one direction or the reverse direction. The servo motor 12 is operated by a control unit 14 which is an electronic control device, referred later in detail.

The variable intake pipe unit comprising the stationary intake pipe 4, the movable intake pipe 5, the guide pipe 6 and the horn 7 is housed in an air cleaner case 15. The case 15 is further provided with an air duct 16 for introducing the ambient air. At the open end 17, a shutter 18 is set to adjust the opening degree of the upper stream side of the air duct 16. The shutter 18 is mounted at the open end 17 by a pivotable means such as a hinge. A return spring 19 is interposed between the shutter 18 and the open end 17, so that the shutter 18 is always urged towards the closing direction of the open end 17. One end of the wire 20 is fixed to the shutter 18 and the other end is fixed to the output section of the servo motor 12. Thus the shutter 18, the return spring 19, the wire 20 and the servo motor 12 constitute a variable throttle mechanism, one example of an air flow resistance adjusting means.

The carburetor 3 is selected from the well known variable venturi-type carburetors with the piston valve. In this type device, a piston valve 23 is slidably arranged in the venturi section 22 formed in the intake passage 21 of the carburetor 3. Its piston valve 23 is formed in a cylindrical shape whose inner space is used as a vacuum chamber 23a in which a spring 23b is elastically mounted. According to this arrangement, the piston valve 23 is biased downwards by the spring 23b. The vacuum chamber 23a is communicated with the venturi section 22 through a bleed hole 23c which is formed in the bottom of the piston valve 23 and defined by the diaphragm 24 connected to the upper section of the piston valve 23. The outside chamber of the diaphragm 24 is communicated with the upper stream of the intake passage 21 through a communicating hole.

Under the piston valve 23, a main nozzle 25 is provided to confront with the venturi section 22. The main nozzle 25 contains a needle jet 26 at one end which is fixed to the piston valve 23 so as to move with the piston valve 23 in the vertical direction in the drawing. The lower end of the main nozzle 25 protrudes into a float chamber 27 and a main jet 28 is set in this chamber 27.

FIG. 2 shows the block diagram of the electronic control circuit in the control unit 14. The revolution signal of the engine generated from the ignition unit is converted to the voltage through the wave shaping circuit and the converter circuit between the revolution speed and the voltage. This voltage is compared with the convertible voltage which is previously set in the setting circuit. When the engine revolving speed reaches a the predetermined value such as 9700 rpm, the comparator outputs the positive signal or the negative signal to actuate the motor drive circuit. The motor drive circuit drives the servo motor 12 for the variable intake pipe length mechanism in one direction or the reverse depending on the signal received. The comparator generates the positive signal when the revolving speed reaches the predetermined value under that engine speed increasing condition or the negative signal when the revolving speed reaches the predetermined value under the engine speed decreasing condition.

An operation of the preferred embodiment of the intake device according to the present invention will be described in the following. The device shown in FIG. 1 indicates the situation during the low speed running. In detail, the stationary intake pipe 4 is tightly connected to the movable intake pipe 5, so that the intake pipe length is extended by connecting the stationary intake pipe 4, the movable intake pipe 5, the guide pipe 6 and the horn 7 all together. Air within the air cleaner case 15 is introduced and supplied to the venturi section 22 from the end of the horn 7 as shown in the arrow represented by the rigid line. This results in the volumetric efficiency of the engine being improved on account of the pulsation effect and the inertia effect derived from the long intake pipe. Under this condition the shutter 18 is kept in the full throttled state; i.e., the sectional area of the intake passage is minimized. Thus the main nozzle 25 facing the venturi section 22 is subjected to the increased vacuum, so that the fuel can be continuously and stably supplied to the engine even though the pulsating wave applied to the venturi section 22 becomes high.

Under the high speed running condition, when the engine speed reaches the predetermined value, the comparator of the control unit 14 generates the reverse output signal as shown in FIG. 2 to actuate the servo motor 12. This results in switching the intake pipe length into the high speed running state. In detail, the signal from the control unit 14 can rotate the servo motor 12 at the predetermined degree in the direction represented by the arrow A, and the wire 13a is pulled in the direction represented by the arrow C. The rotatable drum 8 and the shaft 9 are simultaneously rotated, so that the connecting element 10 integrally made with the shaft 9 is rotated in the direction represented by the arrow E. According to this rotation, the engageable projection 11 is rotated rightwards in the drawing together with the connecting element 10, and the movable intake pipe 5 is moved rightwards. An opening appears between the stationary intake pipe 4 and the movable intake pipe 5, and the air within the air cleaner case 15 is introduced through the opening as shown by the white arrow and flows towards the venturi section 22 through the stationary intake pipe 4. Simultaneously, the wire 20 is pulled to the direction represented by the arrow G by the rotating force of the servo motor 12 and thus the shutter 18 is fully opened. The air flow resistance is decreased so that a large quantity of air can be introduced into the air cleaner case 15. This situation allows a large quantity of air to be sucked in at a high velocity through the short intake pipe as the air/fuel mixture introduced into the internal combustion engine at a high volumetric efficiency is apply to the combustion state in the high speed running condition.

Thereafter, as the engine speed is decreased and reaches the predetermined value by shifting the high speed mode to the low speed mode, the comparator of the control unit 14 generates the reverse signal output to switch the intake pipe length to the low speed mode. In detail, the servo motor 12 rotates in the direction represented by the arrow B in response to the signal of the control unit 14. The wire 13b is pulled in the direction represented by the arrow D, and thus the rotatable drum 8, the shaft 9 and the connecting element 10 are rotated in the direction represented by the arrow F. The movable intake pipe 5 moves leftwards in the drawing so that the opening between the stationary intake pipe 4 and the movable intake pipe 5 is closed tightly. Under this condition, the wire 20 is loosen so that it can be moved in the direction represented by the arrow H and the shutter 18 is throttled to the predetermined closed degree by the bias force of the return spring 19. This causes the intake pipe length to be long for the low speed running mode in which the pulsation effect and the inertia effect can be utilized. Under driving condition of the engine 1, the control unit 14 is actuated in response to the revolving speed signal and thus the intake pipe length and the throttle opening degree are automatically adjusted.

According to this preferred embodiment, although the intake pipe length is extended, the area of the intake passage is decreased and the absolute value of the vacuum pressure is increased by means of the variable throttle mechanism in link with the variable intake pipe length mechanism. This allows that the air fuel mixing section is less subjected to the effects of the pulsating wave, so that the mixture is prevented from becoming lean. Even if the engine speed varies during the low running mode, the fluctuation of the air/fuel ratio will be kept within the desired range. Therefore, this solves the following severe problems which can not be overcome by only using the variable fuel adjusting carburetor. In detail, the fuel injection from the main nozzle is pulsatingly fluctuated since the venturi section 22 is subjected to the positive or negative pulsating wave, so that the injection is not continuously executed. According to this fact, the air/fuel ratio is also fluctuated in response to the change of the engine speed. This system of the preferred embodiment can resolve these problems and keep the output performance and the air/fuel ratio stable over the whole range of engine speeds. Further, the vacuum pressure adjusted by the shutter 18 simultaneously observed in the venturi section 22. This can improve the response characteristics in comparison with the conventional variable fuel adjusting mechanism which adjusts the air/fuel ratio by the quantity of the fuel injection in response to the opening degree of the main jet. In addition to these advantages, this system can keep the air/fuel ratio adapted to the wide range of the engine speed only by setting the carburetor at the high speed running mode. This system does not require the conventional variable fuel adjusting type carburetor. From the cost viewpoint in construction, the combination of the variable intake pipe length mechanism and the variable throttle adjusting mechanism according to the present invention is extremely superior to that of the variable intake pipe length mechanism and the variable fuel adjusting mechanism.

Further, in this preferred embodiment the air cleaner case which has been previously arranged in the upper stream of the carburetor as a necessary element, is utilized as the case for the preferred embodiment and this results in achieving a simple structure with eliminating the specially arranged element.

In the present invention, the variable intake pipe length mechanism is not limited to the configuration shown in this preferred embodiment. Also the shutter 18 can be varied in its configuration, operating mechanism, and fitting position. For example, the shutter 18 may be mounted at the open end of the duct 16 within the air cleaner case 15. This may be applied to the second embodiment, described later.

Figure 3:
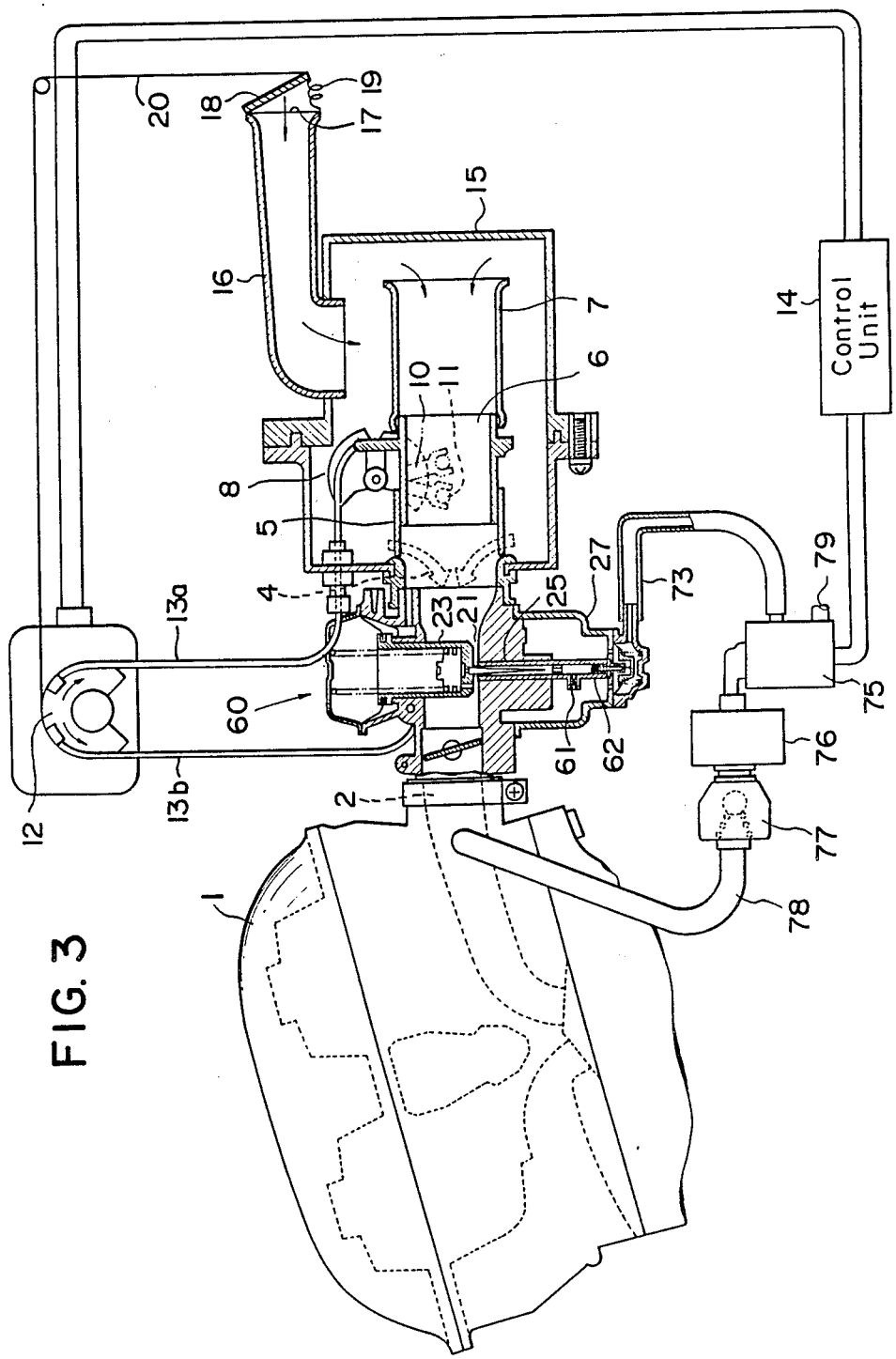
FIG. 3 is a schematic illustration showing a whole system of the intake device of the second embodiment of the intake device according to the present invention.
Figure 4:
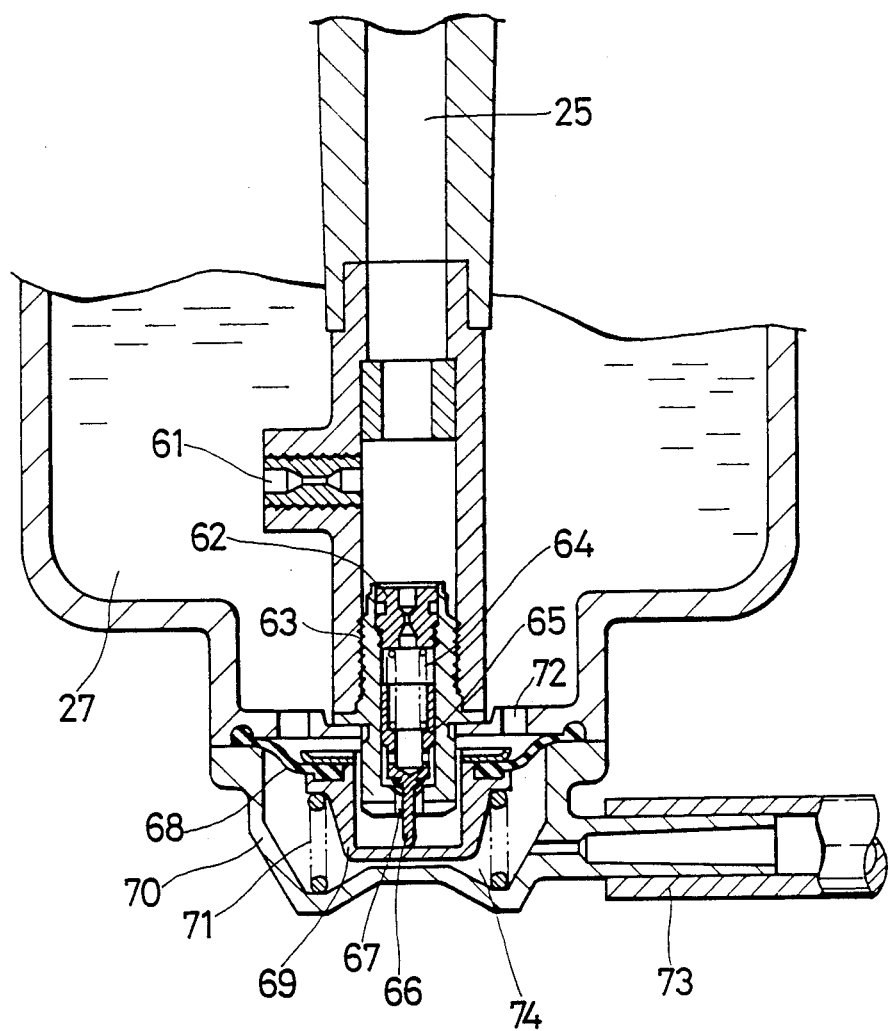
FIG. 4 is an enlarged sectional view showing the essential components employed in the second embodiment of the intake device according to the present invention.
Figure 5:
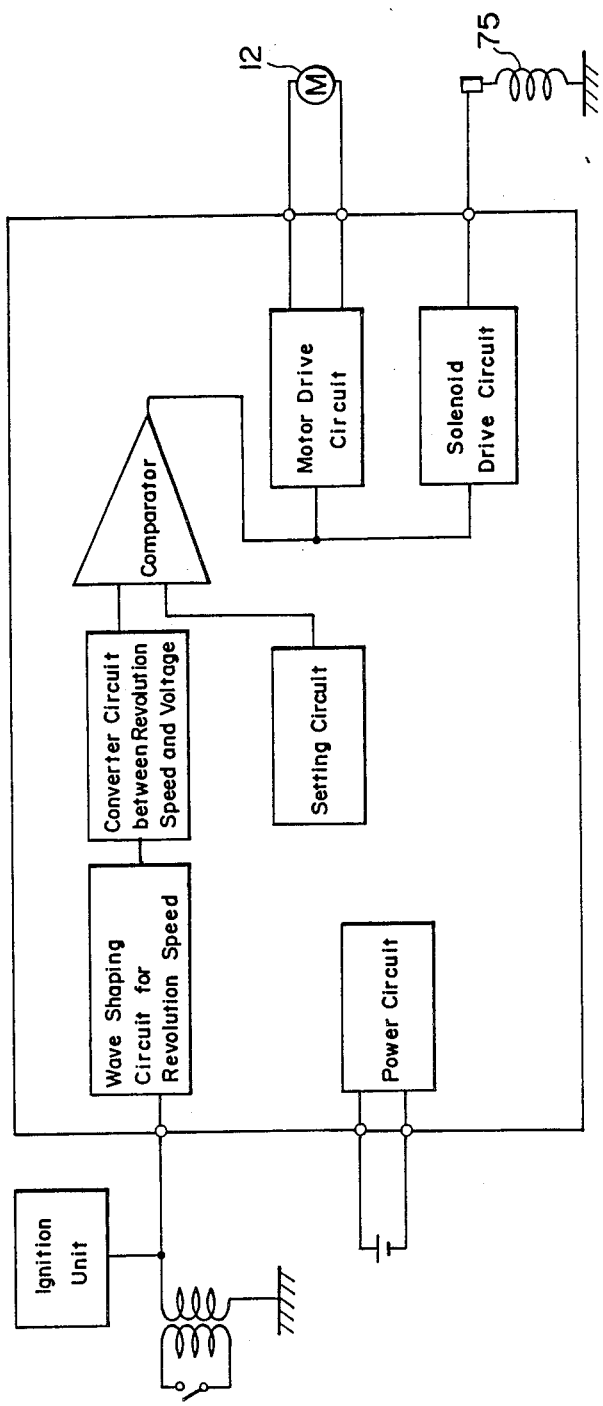
FIG. 5 is a block diagram for executing an electronic control for the variable intake pipe length mechanism and the air flow resistance adjusting means of the intake device shown in FIG. 3.

FIG. 3 to FIG. 5 show the second preferred embodiment of the intake device for a motorcycle according to the present invention.

This second embodiment is identical to the structure of the first preferred embodiment except for the added variable fuel adjusting mechanism. In these drawings the same numerals denote the same parts or corresponding elements in the first embodiment, so that the same explanation will not be repeated except for the newly added numerals for the variable fuel adjusting mechanism.

FIG. 3 shows the schematic construction of the intake system used in the internal combustion engine for motorcycle. FIG. 4 shows the detailed construction for the carburetor. This intake device has the variable intake pipe length mechanism, the variable throttle mechanism, and the variable fuel adjusting type carburetor provided with the variable fuel adjusting mechanism. In detail, a variable fuel adjusting type carburetor 60 connected to the intake port 2 of the internal combustion engine 1 is identical to the variable venturi type carburetor used in the first embodiment except for the added variable fuel adjusting mechanism. This mechanism is arranged at the bottom of the main nozzle 25 in the float chamber 27. At the bottom of the main nozzle 25 a first main jet 61 and a second main jet 62 are arranged, and the first main jet 61 is in communication with the fuel flow so as to always supply the fuel therethrough. On the other hand, the second main jet 62 is fitted on the upper end of a holder 63 which is inserted into the tip end of the main nozzle 25. A valve mechanism is set at the lower section of the holder 63 and the fuel can be supplied only while the valve is opened. Under the second main jet 62 a needle valve 65 is housed in the holder 63 and biased by a needle spring 64 so as to move in its longitudinal direction. A tip end projection 66 of the needle valve 65 is biased so as to protrude downwards through the opening 67 formed in the bottom of the second main jet 62. Further in the bottom of the float chamber 27 a cup 69 having a diaphragm 68 is arranged so as to cover the end of the second main jet 62, and the tip end projection 66 is contacted to the bottom surface of the cup 69. A return spring 71 is elastically arranged between the cup 69 and its housing 70 so that the cup 69 is biased upwards by this return spring 71. Since the elastic force of the return spring 71 is stronger than that of the needle spring 64, the needle valve 65 is pressed upwards under the ordinary condition and the opening 67 is prevented from closing by the needle valve 65. The upper side of the diaphragm 68 is communicated with the float chamber 27 through a communicating opening 72 formed in the bottom of the float chamber 27, so that the fuel can be supplied to the second main jet 62. The housing 70 is connected to a vacuum pipe 73 which is communicated with a vacuum chamber 74 defined between the housing 70 and the diaphragm 68.

As shown in FIG. 3, the vacuum pipe 73 is connected to a solenoid valve 75 so as to introduce either the vacuum pressure or the atmospheric pressure into the vacuum chamber 74. Further the vacuum pipe 73 is connected to an intake manifold 2 through a surge tank 76, a check valve 77 and another vacuum pipe 78 from the solenoid valve 75. The solenoid valve 75 is switched between its vacuum intake position and atmosphere intake position by the control unit 14. The reference numeral 79 denotes an opening opened to the atmosphere.

FIG. 5 is a block diagram showing the electronic control circuit for the control unit 14. This circuit is almost similar to that shown in FIG. 2 except for the new addition of the solenoid driving circuit actuated in response to the motor driving circuit. In detail, the solenoid valve 75 is switched into the vacuum position to actuate the servo motor 12 for the high speed running mode and alternatively it is switched into the atomosphere position to actuate the servo motor 12 for the low speed running mode.

An operation of this embodiment will be described in conjunction with FIGS. 3 to 5. The operation of the variable intake pipe length mechanism and the variable throttle device is the same as the first preferred embodiment except for the variable fuel adjusting mechanism actuated in response to the mechanism and device. Thus the operation on the variable fuel adjusting mechanism will be mainly described.

FIG. 3 shows the condition in the low speed running mode. The variable intake pipe length mechanism is kept in its extended state in which the intake pipe is connected from the stationary intake pipe 4 to the horn 7 by tightly connecting between the stationary intake pipe 4 and the movable intake pipe 5. On the same occasion the throttle degree of the shutter 18 is slightly restricted by the return spring 19. In this variable fuel adjusting mechanism, the vacuum chamber 74 is subjected to the atmospheric pressure, so that the needle valve 65 is opened and therefore the second main jet 62 can also supply the fuel in addition to the first main jet 61. This may cause the vacuum level to rise by throttling properly and the fuel may be supplied at a relatively large quantity by the variable fuel adjusting mechanism even if the pulsating wave wil become greater. As a result, the air/fuel ratio may be kept in its optimum level. Further, in this mechanism the shutter 18 can be free from over-throttling, and thus the intake air can be sufficiently supplied to the engine during the low speed running.

As the driver intends to increase the vehicle speed, the servo motor 12 and the solenoid valve 75 are actuated in response to the signal from the control unit 14 to switch the air/fuel ratio into the high speed running mode. In detail, the servo motor 12 is revolved in response to the signal from the control unit 14 and the variable intake pipe length mechanism is placed in the high speed mode and the shutter 18 is simultaneously opened in the same manner as the first preferred embodiment. The solenoid valve 75 is switched to apply the vacuum to the cup 69 by the signal from the control unit 14 in synchronism with the actuation of the variable intake pipe length mechanism. The vacuum stored in the surge tank 76 through the intake port 2 is introduced into the housing 70 through the vacuum pipe 73 and the cup 69 is pulled downwards in the drawing. Thus the needle valve 65 is moved downwards to tightly close the opening 67 of the second main jet 62. The fuel is supplied through only the first main jet 61 to restrict the fuel quantity, so that the fuel enriched state owing to the over-vacuum at the venturi section can be corrected to adjust the air/fuel ratio to its optimum level.

As the engine speed reaches the predetermined value after switching from the high speed running mode to the low speed running mode, the signal representing the engine speed is input to the control unit 14. In response to the signal from the control unit 14, the servo motor 12 and the solenoid valve 75 are actuated to switch their position to the low speed mode. In detail the servo motor 12 is first rotated in its low speed mode direction to set the intake pipe length into the long state constituted by the stationary intake pipe 4, the movable intake pipe 5, the guide pipe 6 and the horn 7. The wire 20 is released by the rotation of the servo motor 12 and the shutter 18 is moved to restrict its throttle degree. The shutter 18 is moved by the return spring 19 to its slightly closed state. In the variable fuel adjusting mechanism, the needle valve 65 is opened by the switching motion of the solenoid valve 75 and the fuel can be supplied through the second main jet 62 in addition to the first one. As a result, the air/fuel ratio is adjusted to the low speed running mode.

The system according to the second embodiment can generate an excellent performance over the entire engine speed range since the system is provided with the variable fuel adjusting mechanism in addition to the variable intake pipe length mechanism and the variable throttle mechanism. In other words, the opening area ratio $R=S_1/S_2$ will decide the compensation degree of the air/fuel ratio where $S_1$ represents the intake passage area at the full open degree and $S_2$ represents the intake passage area at the restricted throttle degree. As the opening area ratio $R=S_1/S_2$ becomes large, the compensating degree of the air/fuel ratio also becomes large. Therefore, the compensation of the air/fuel ratio is increased as the difference between the intake pipe length for the high speed running and that of the low speed running in the variable intake pipe length mechanism is increased. This requires an increase in the value of the opening ratio R. However, if the opening area ratio R becomes too large, the intake air quantity becomes less and reduction of the engine performance will be also caused even when the driving condition is under the low speed running. Thus the opening area ratio R should be limited within a specific allowable range. On the other hand, even if the opening area ratio R is found within the range where the engine performance can be free from over-reducing by adjusting the throttle at a fine degree, this might not completely compensate for any cases.

This system according to the second embodiment containing the variable fuel adjusting device can fully compensate the above case. In this system, the variable throttle device can not be completely regulated within the low speed running range lower than the minimum throttle degree, but the intake air is sufficiently introduced to generate the required engine power. The variable fuel adjusting mechanism is cooperatively actuated to supply the enriched fuel to compensate the air/fuel ratio. As a result, this system can keep the desired combustion condition of the internal combustion engine, which is equipped with the intake pipe length mechanism, over the entire speed range.

Figure 6:
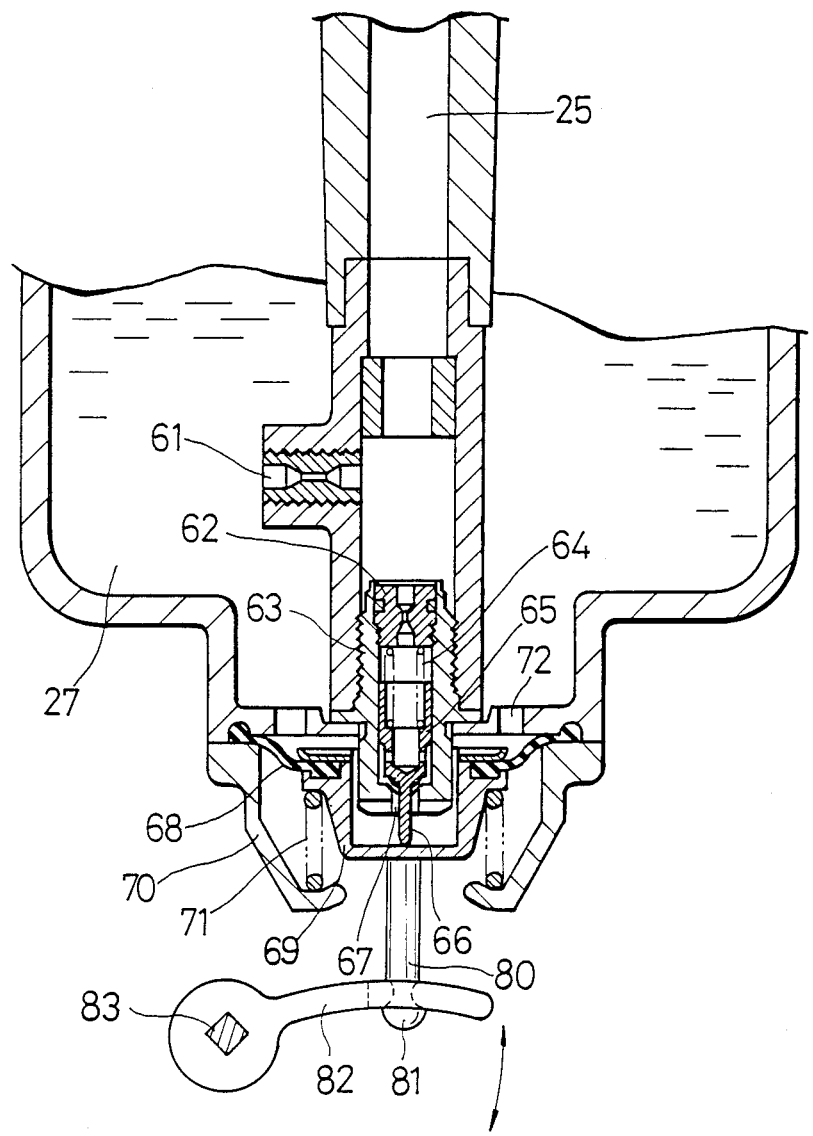
FIG. 6 is an enlarged sectional view showing the essential components employed in the third embodiment of the intake device according to the present invention.

FIG. 6 shows the third embodiment which is essentially identical as the second embodiment except that the valve mechanism of the second main jet in the variable fuel adjusting mechanism is modified. Therefore, the same numerals denote the same parts or the corresponding elements of the second embodiment and the same explanation on the numerals will not be repeated.

In the third embodiment, the needle valve 65 is operated without using the vacuum pressure. A rod 80 projects downwards from the center of the cup 69 which is fixed to the diaphragm 68. An engagable groove 81 is formed at the tip sectin of the rod 80 and a form shape arm 82 is engaged with this groove 81. The arm 82 is fixed to a rotatable shaft 83 which is rotated with the motor, so that the arm 82 can be turned vertically as shown by the arrow in FIG. 6. As the shaft 83 is rotated, the rod 80 fixed to the arm 82 is also moved in the vertical direction. According to this vertical motion, the second main jet 62 is switched between its opened and closed position and the variable fuel adjusting mechanism is turned on or off. The shaft 83 can be supported by fixing it onto the carburetor of the variable fuel adjusting mechanism. Further, the shaft 83 is preferably actuated by the servo motor of the variable intake pipe length mechanism, this causes the advantage that the variable fuel adjusting mechanism is actuated in linkage with the variable intake pipe length mechanism. This system is not only limited to use the carburetor containing two main jets for the variable fuel adjusting mechanism, but it may also employ another one having the diaphragm.

In the third embodiment the valve in the variable fuel adjusting mechanism is directly actuated by the rotatable shaft, this can perform a quick-response operation at a low cost in comparison with the methods that the diaphragm is actuated by the vacuum pressure in the intake manifold or the switching operation is actuated by an electromagnetic means.

FIG. 7 to FIG. 10 show the fourth to seventh embodiments. They show various modifications of the variable throttle mechanism. Each of these devices throttles the opening area of the intake passage only in the low speed running mode, not in the high speed running mode. This system can always generate the optimum engine power over the whole engine speed range. In these drawings, the same numerals denote the same or corresponding parts shown in FIG. 7 and thus the same explanation will not be repeated.

Figure 7:
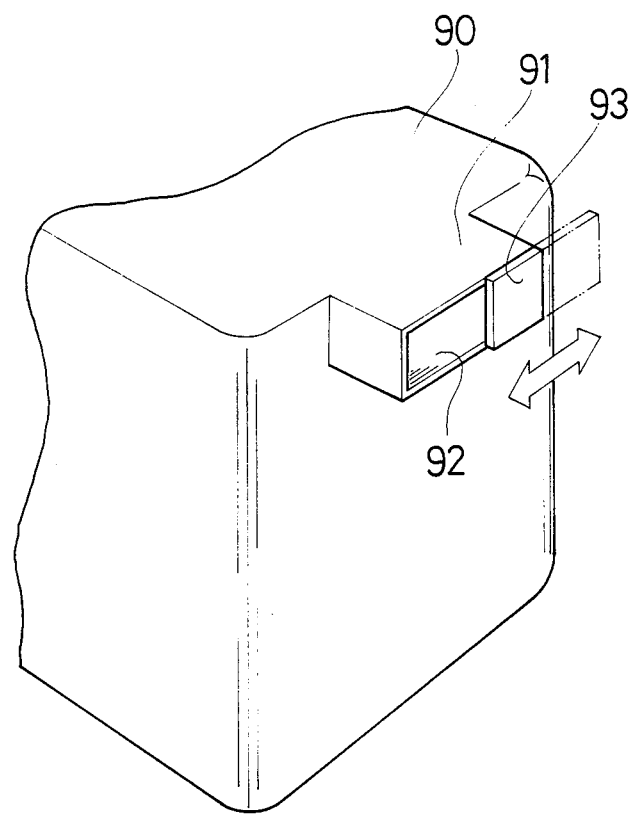
FIG. 7 is an enlarged schematic illustration showing essential components according to the fourth embodiment.

The fourth embodiment shown in FIG. 7 employs the sliding type shutter for the variable throttle mechanism, in which an air duct 91 is provided in an air cleaner case 90 and its opening 92 is adjustably closed by a sliding type shutter 93. This shutter 93 is slidably moved as represented by the phantom line shown in FIG. 7 to adjust the throttle degree of the opening 92.

Figure 8:
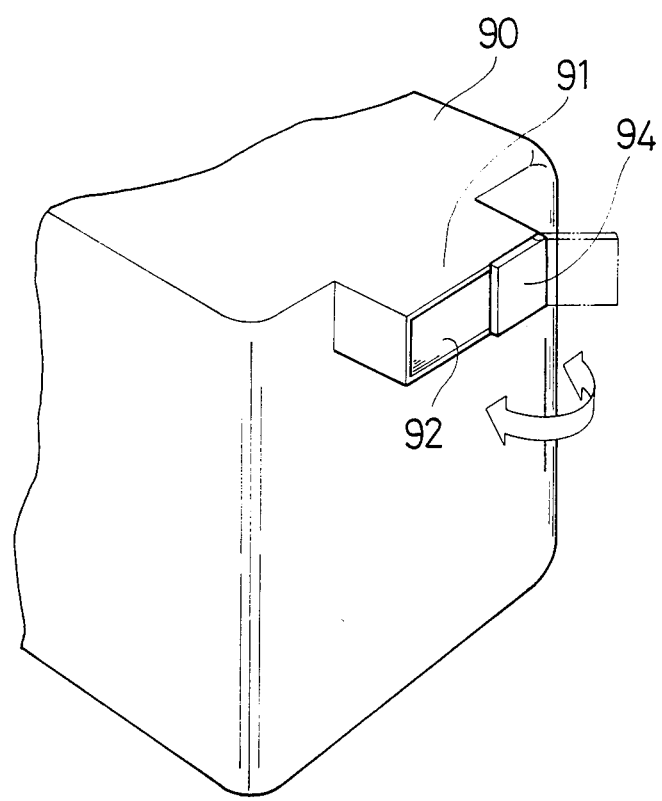
FIG. 8 is an enlarged schematic illustration showing essential components according to the fifth embodiment.

The fifth embodiment shown in FIG. 8 employs the turning type shutter for the variable throttle mechanism, in which a turning type shutter 100 is pivotably set at the opening 92 by means of a hinge, not shown in the drawing. This shutter 100 can be turned as represented by the phantom line shown in FIG. 8 to adjust the throttle degree of the opening 92.

Figure 9:
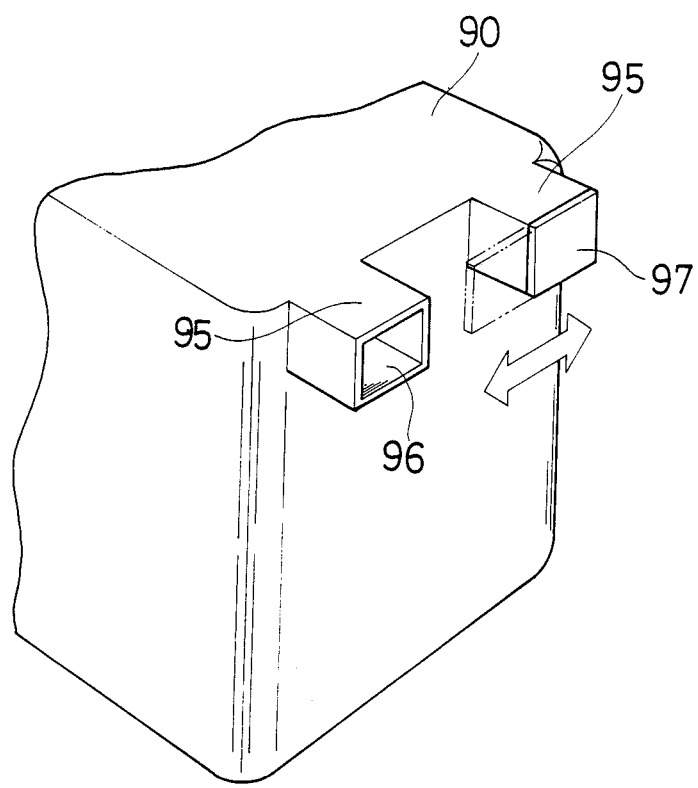
FIG. 9 is an enlarged schematic illustration showing essential components according to the sixth embodiment.
Figure 10:
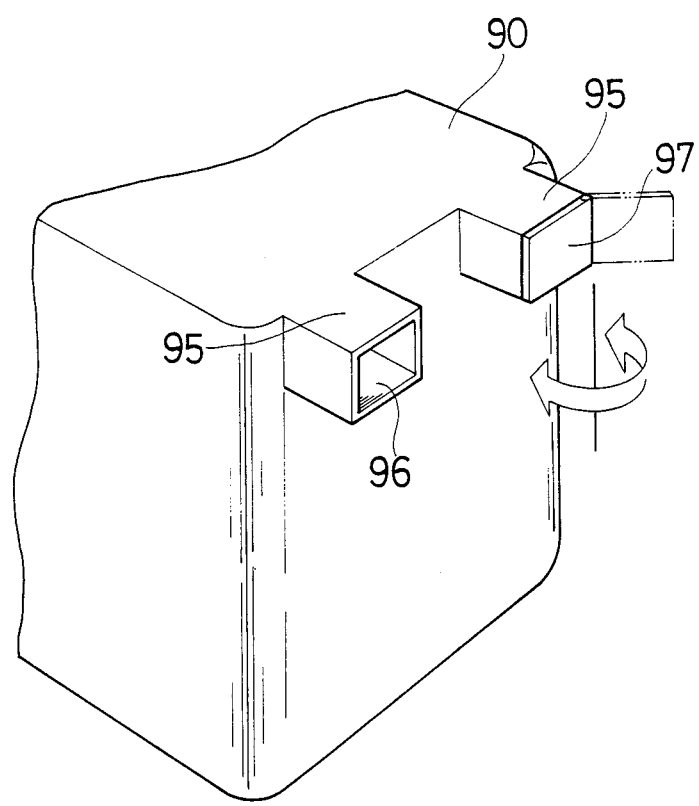
FIG. 10 is an enlarged schematic illustration showing essential components according to the seventh embodiment.

FIG. 9 and FIG. 10 show another modification which has a pair of ducts, one of which is provided with a shutter. The sixth embodiment shown in FIG. 9 employs a sliding type shutter 97 to adjustingly close an opening 96 in the same manner as the fourth embodiment. The seventh embodiment shown in FIG. 10 employs a turning type shutter 98 to adjustingly close an opening 96 in the same manner as the fifth embodiment. This system may employ two or more ducts as required. The variable throttle mechanism is not only limited to the above described configuration, but some variations may also be applied to this. For example, a pair of plates formed with many slits are overlapped and moved in the sliding or turning direction to adjust their opening area. Further, the variable throttle mechanism may be actuated by the servo motor which is controlled in response to the engine revolving speed. Its control manner is not limited to this method, but various methods may also be employed.

The variable throttle mechanism performs its throttling operation only in the low speed running mode to increase the air flow resistance and thus the vacuum pressure level at the venturi section is also increased so as to keep the fuel sucking at a constant rate. In the high speed running mode the throttle is not actuated so as to introduce a sufficient quantity of intake air for the high speed running condition. Accordingly, this system can always generate the optimum engine power over the all speed range.

FIG. 11 to FIG. 16 show the eight preferred embodiment of the intake device for a motorcycle according to the present invention. This embodiment and the following ninth embodiment employ the fixed throttle mechanism as the air flow resistance adjusting means of the present invention.

Figure 11:
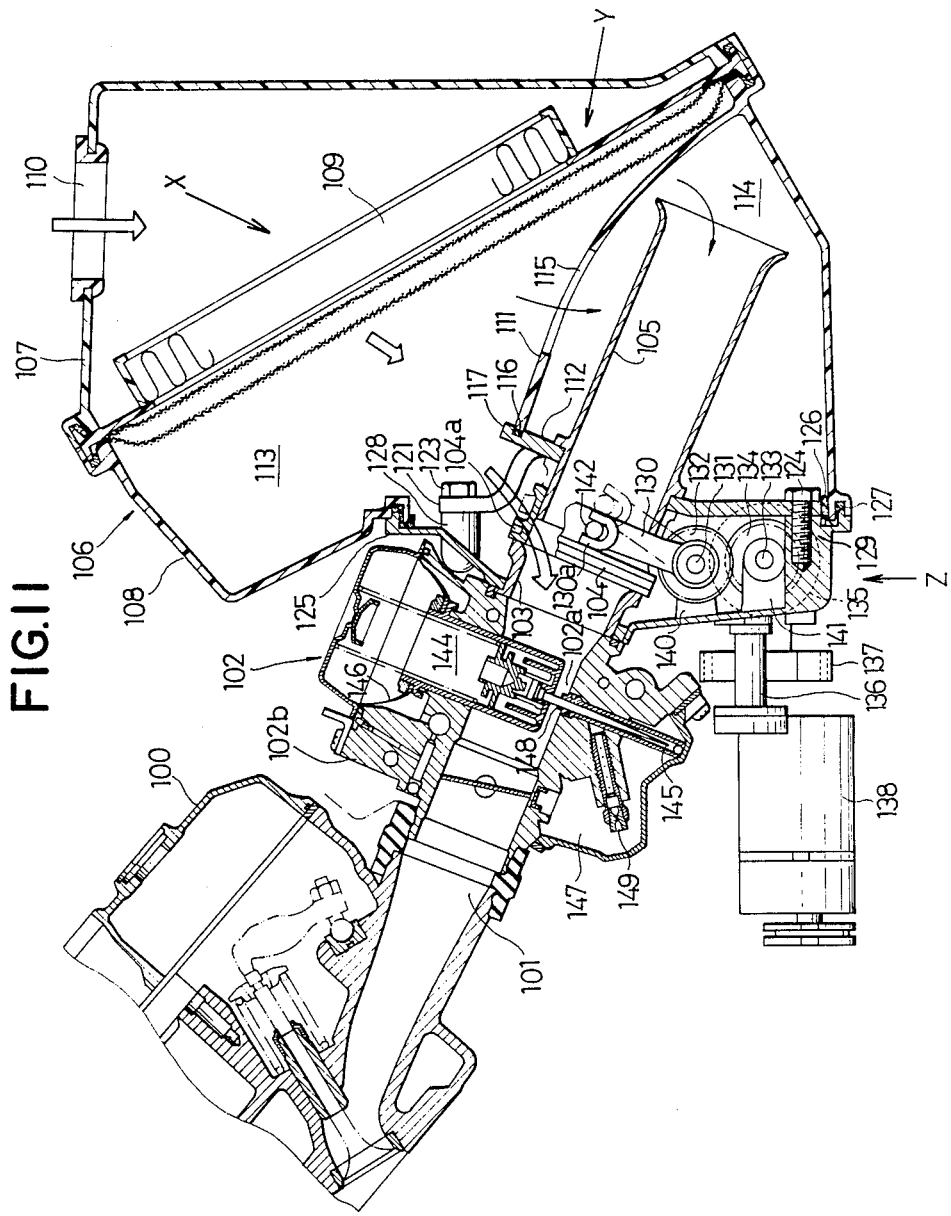
FIG. 11 is an enlarged sectional view showing the intake system employed in the eighth embodiment of the intake device according to the present invention.

FIG. 11 is a sectional view of an intake system for an internal combustion engine.

An intake port 101 of the internal combustion engine 100 is connected to a carburetor 102. At the upper stream of the carburetor 102 a stationary intake pipe 103 is fixedly arranged. The upper stream end of the stationary intake pipe 103 can be connected to or isolated from a guide pipe 105 through a movable intake pipe 104. The movable intake pipe 104 is formed in a ring shape which is slidably mounted on the end section of the guide pipe 105. The stationary intake pipe 103, the movable intake pipe 104, and the guide pipe 105 constitute the variable intake pipe length mechanism, but the detailed constitution is not described because it is the same as the first embodiment.

The variable intake pipe length mechanism is wholly housed in an air cleaner case 106. The case 106 comprises a top case 107 and a bottom case 108, and its interior is divided by an air cleaner element 109 into the dirty side open to the ambient air and the clean side open to the intake pipe. An opening is formed in the side wall of the dirty side and is used as a first intake passage 110.

Figure 12:
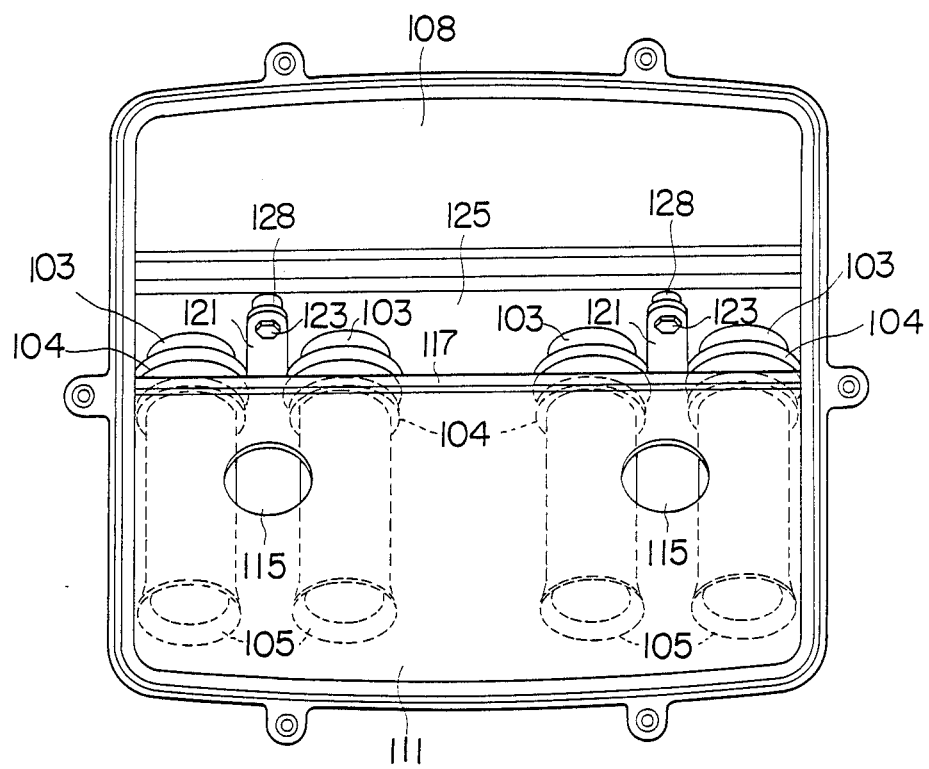
FIG. 12 is a plan view taken in the direction of the arrow X in FIG. 11, showing the dividing wall in the air cleaner case.

The interior in the clean side is further divided into two chambers, a high speed chamber 113 and a low speed chamber 114, by a dividing wall 111 and an intake pipe stay 112. FIG. 12 shows a schematic plan view taken in the direction X in FIG. 11 of the interior of the air cleaner case 106 with removing the top case 107 and the air cleaner element 109. The dividing wall 111 is integrally extended inwards from the wall of the air cleaner case 106 and is formed with a plurality of openings 115 as the second intake passage for communicating between the high speed chamber 113 and the low speed chamber 114. The protruded forward end of the wall 111 is connected to one end 117 of the intake pipe stay 112 through a sealing member 116 such as a sponge.

Figure 13:
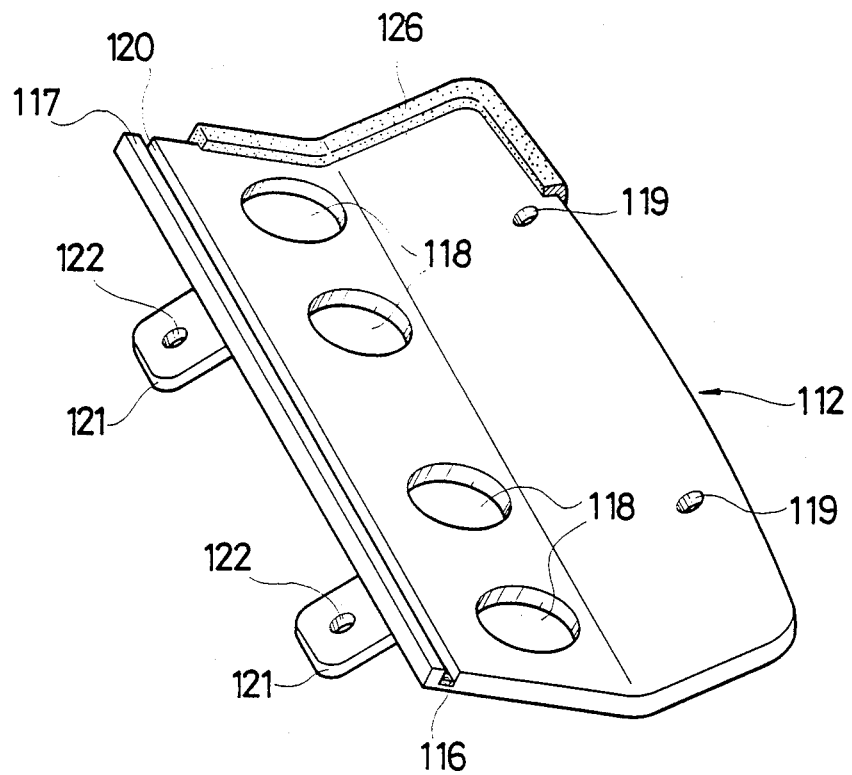
FIG. 13 is a schematic view showing the intake pipe stay of the eighth embodiment.
Figure 14:
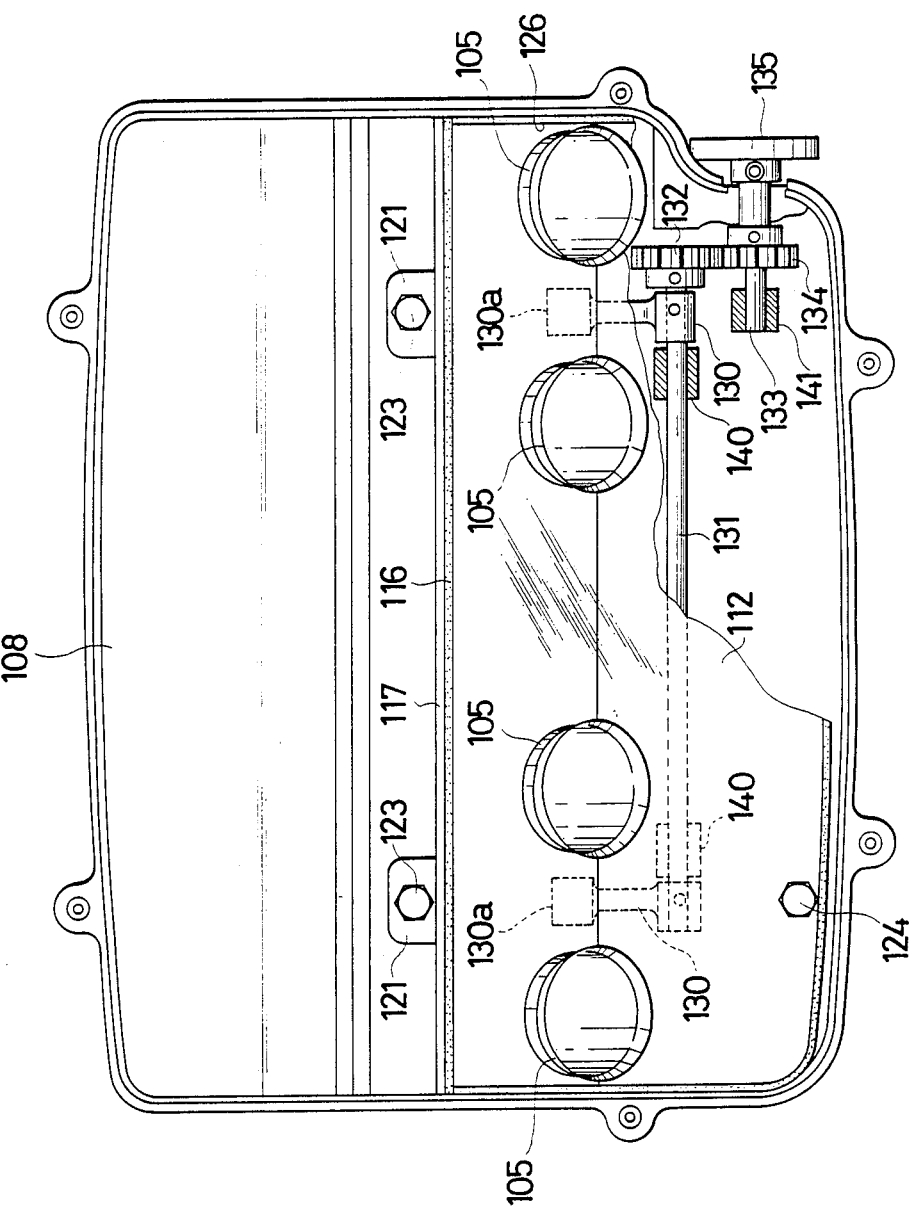
FIG. 14 is a schematic view taken in the direction of the arrow Y in FIG. 11, showing the interior of the air cleaner case.

As shown in FIG. 13 and FIG. 14, the intake pipe stay 112 is a plate member in a substantially rectangular shape with a plurality of openings 118 for fitting with the guide pipe and a plurality of fitting holes 119 for the stay 112 itself. The end 117 of the stay 112 is formed with a groove 120 in which the protruded end of the dividing wall 111 can be engaged. The sealing member 116 is previously set in the groove 120. A plurality of fitting stays 121 is integrally protruded from the end 117 and each of the stays 121 is formed with a hole 122 for bolt fixing. Thus the intake pipe stay 112 is fixed to a carburetor fitting plate 125 through the fitting holes 119 and 122 and bolts 123 and 124.

In FIG. 13, the numeral 126 denotes a sealing member made of a sponge like material which is surroundingly mounted on the periphery of the intake pipe stay 112 except for the end 117. As the intake pipe stay 112 is assembled with the bottom case 108, the sealing member 126 will be tightly fitted to the inner face of the bottom case 108.

FIG. 14 is a schematic illustration of the intake pipe stay 112 taken in the direction represented by the arrow Y in FIG. 11 with removing the top case 107, the air cleaner element 109 and the dividing wall 111.

As shown in FIG. 11 to FIG. 13, the carburetor fitting plate 125 is previously assembled with the carburetor 102. The bottom case 108 is formed with a plurality of openings in its bottom periphery.

The bottom case 108 is fixed to the carburetor fitting plate 125 through these openings and the sealing member 172. In FIG. 11, the numerals 128 and 129 denote bosses integrally and protrudingly formed for engaging with the bolts 123 and 124.

As shown in FIG. 11, the end of the guide pipe 105 is engaged within the fitting opening 118 of the intake pipe stay 112 and its upper stream side is opened to the low speed chamber 114. The lower stream side of the guide pipe 105, the movable intake pipe 104 and the stationary intake pipe 103 are disposed in the high speed chamber 113. According to this arrangement, the periphery around the stationary intake pipe 103 and the movable intake pipe 104 is not divided by the intake pipe stay 112 so that the periphery is opened to the air cleaner element 109 in the high speed chamber 113.

Figure 15:
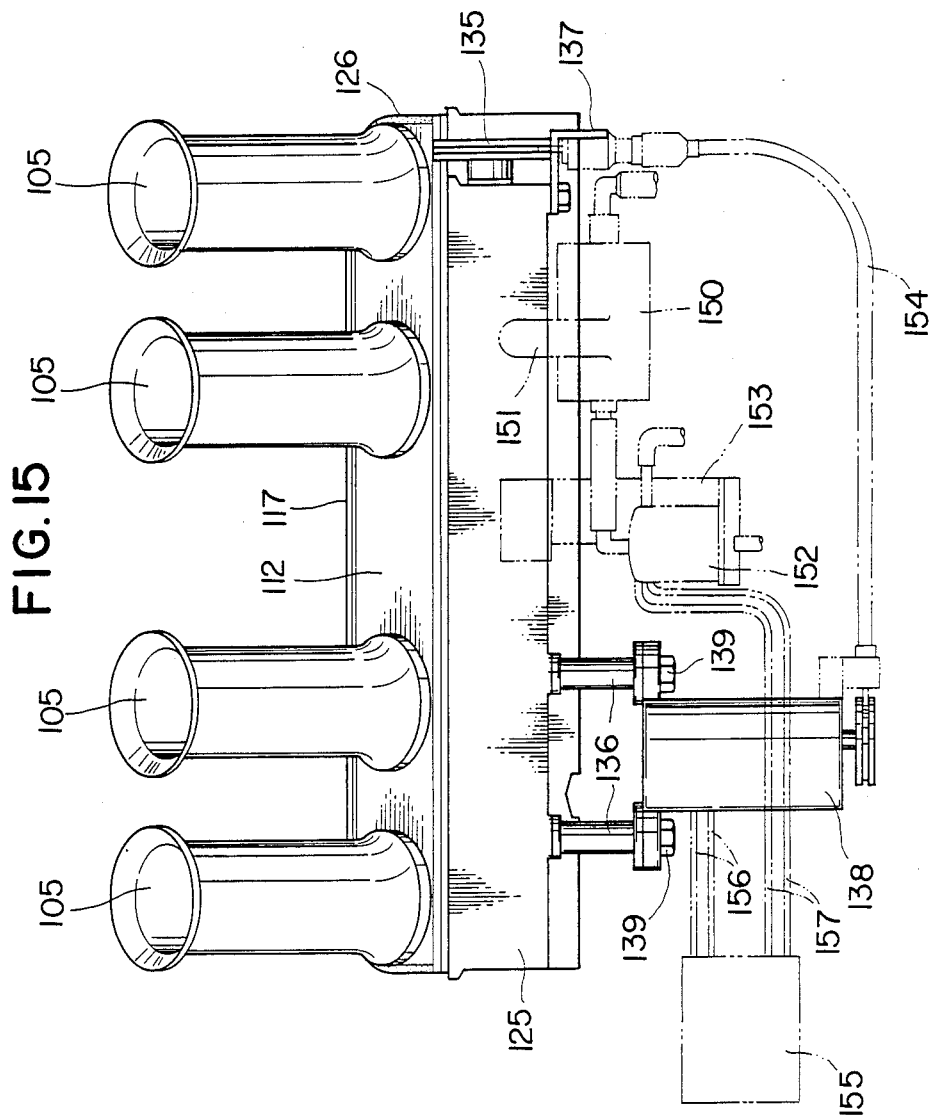
FIG. 15 is a schematic view taken in the direction of the arrow Z in FIG. 11, showing the carburetor fitting plate which is previously assembled with the intake pipe stay.

The driving parts for sliding the movable intake pipe 104 on the guide pipe 105 are previously mounted on the carburetor fitting plate 125. As shown in FIG. 11 to Fig. 14, the driving parts contains a rotatable arm 130, an arm shaft 131, an arm shaft gear 132, a drum shaft 133, a drum shaft gear 134, a drum 135, a boss 136, a wire holder 137, and a servo motor 138. They are previously assembled on the carburetor fitting plate 125. The servo motor 138 is fixed to the carburetor fitting plate 125 by fixing bolts 139 to the bosses 136 as shown in FIG. 15. FIG. 15 is a perspective view taken in the direction represented by the arrow Z in FIG. 11, shows the assembled state of the servo motor 138 on the carburetor fitting plate 125.

The arm shaft 131 is longitudinally arranged in the air cleaner case 106 and rotatably mounted on the stay 140 which is fixed to the carburetor fitting plate 125. A pair of the rotatable arm 130 is fixed to both ends near the stay 140 and the arm shaft gear 132 is fixed to the rotatable arm 130.

The drum shaft 133 is rotatably mounted on a stay 141 which is fixed to the carburetor fitting plate 125. The drum shaft gear 134 and the drum 135, which is located outside of the air cleaner case 106, are fixed on the drum shaft 133. The drum shaft gear 134 meshes with the arm shaft gear 132 and the former has a larger diameter than that of the latter. They constitute a reduction gear mechanism. This can achieve high reduction rate. On the other hand, this may be configured as an accelerating mechanism. The reduction rate or acceleration rate can be varied over a wide range.

Figure 16:
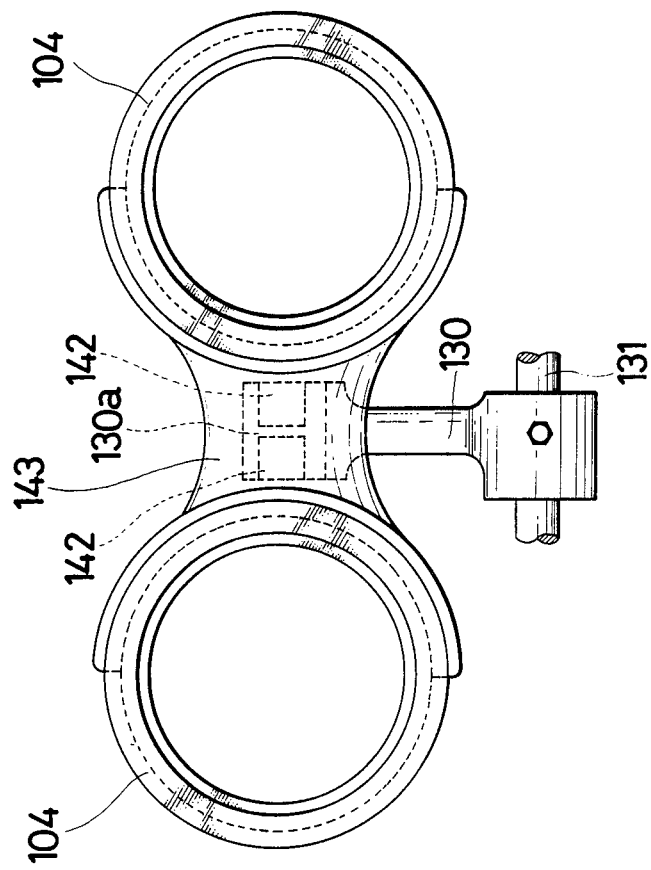
FIG. 16 is an enlarged schematic illustration showing the essential components of the eighth embodiment.

The rotatable arm 130, as shown in FIG. 11, has a tip end in a U-shaped section 130a which can engage with a projection 142 protruded outwards form the movable intake pipe 104. The external periphery of the movable intake pipe 104 is formed with a groove 104a. As shown in FIG. 16, a pair of the movable intake pipe 104 arranged in parallel each other is assembled in a single member through a bridge member 143 which engages with the groove 104a. The U-shaped section 130a engaged with pair of the projections 142 protruded from each the movable intake pipes 104. According to this engagement, two movable intake pipes 104 in parallel are simultaneously actuated by one rotatable arm 130.

Herebelow, a brief description on the structure of the carburetor 102 is as follows.

This carburetor 102 has the similar structure as the first embodiment. In detail, a piston valve 144 is so arranged in the carburetor housing 102b above the venturi section 102a of the carburetor 102 as to move vertically. In the bottom of the piston valve 144 a jet needle 145 is arranged at its center. A return spring is installed in the vacuum chamber which is isolated from the ambient air through a diaphragm 146, so that the piston valve 144 is biased downwards by the force of the spring. The jet needle 145 is so arranged as to adjust the opening degree of the exit of the main nozzle 148 extended from the float chamber 147. One end of the main nozzle 148 protrudes in the interior of the float chamber 147 and a main jet 149 is also arranged therein.

An operation of this preferred embodiment of the intake device according to the present invention will be described in the following. The device shown in FIG. 11 indicates the situation during the low speed running, in which the movable intake pipe 104 is positioned at the left most side where it contacts with the stationary intake pipe 103 so that the gap is closed. The intake pipe length becomes long and the air is introduced from the right end of the guide pipe 105. In this state, the intake air passes through the low speed chamber 114 and thus the intake air flow is automatically changed to the second intake passage. Accordingly the vacuum pressure is shifted to the upper level which increases the air flow resistance. The vacuum pressure applied to the main nozzle 148 is so increased as to reduce the effects of the growing pulsating wave grown caused by the long intake pipe. As a result, the air/fuel ratio can be adjusted to the optimum value for the low speed running.

On the other hand, when the engine speed reaches to the predetermined level during the high speed running, the servo motor 138 is revolved at a predetermined degree in the control manner described in the first embodiment. Then the wire, not shown in the drawing, is pulled and the drum 135 is rotated. The revolving force of the drum 135 is reducingly transmitted from the drum shaft gear 134 to the arm shaft gear 132 and the arm shaft 131 and the rotatable arm 130 integrated therewith are rotated in the clockwise direction. The projection 142 of the movable intake pipe 104 is simultaneously moved in response to the movement of the U-shaped section 130a of the rotatable arm 130. The movable intake pipe 104 is also moved rightwards in the drawing over the guide pipe 105, so that the gap therebetween is opened. Then the air is introduced from the high speed chamber 113 through the gap as represented by the white arrow in the drawing. The intake air flows through the short intake passage; i.e., the air flow has been automatically switched to the first intake passage 110. This passage reduces the air flow resistance to adjust the air/fuel ratio to the high speed running mode.

As mentioned above, as the intake pipe length is switched between the high speed running mode and the low speed running mode in response to the predetermined engine speed, the intake passage is automatically shifted to the other. The mechanism to change the intake air flow resistance is satisfied by only the variable intake pipe length mechanism. This fact results in a remarkably simple structure and reducing the number of the moving components. Further, the required air/fuel ratio can be easily set by adjusting only the carburetor if the intake passage area and the capacities of the high speed and low speed chambers are properly selected.

In this embodiment, the parts of the drive system for the movable intake pipe 104 are wholly pre-assembled on the carburetor fitting plate 125. This pre-assembling work can be conducted in the other step than the working step for assembling the carburetor 102 to the engine body 100 and thereafter the carburetor 102 is only connected to the intake port 101. This can improve the working efficiency on the assembly line.

The pre-assembling manner on the carburetor fitting plate 125 is not limited to the above, but various manner can be also employed. For example, if the carburetor 102 used in the eighth embodiment is replaced by the variable fuel adjusting type carburetor, the components required for the latter one can be pre-assembled. Among the components shown by the phantom lines in FIG. 15, a surge tank 150, a stay 151, a solenoid 152, and another stay 153 are used for that type carburetor. The other numerals 154, 155, 156 and 157 denote control unit wire cable, and control lines respectively.

Figure 17:
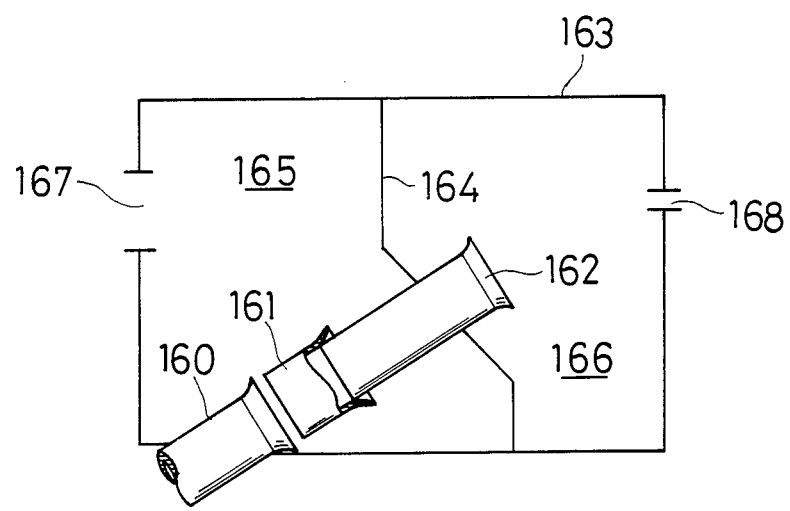
FIG. 17 is a schematic illustration for explaining the system of the ninth embodiment of the intake device according to the present invention.
Figure 18:
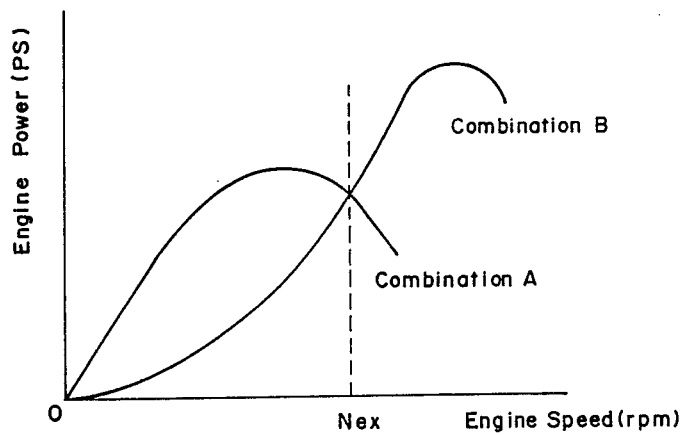
FIG. 18 is a graph showing the relationship between the intake pipe length and the engine power.
Figure 19:
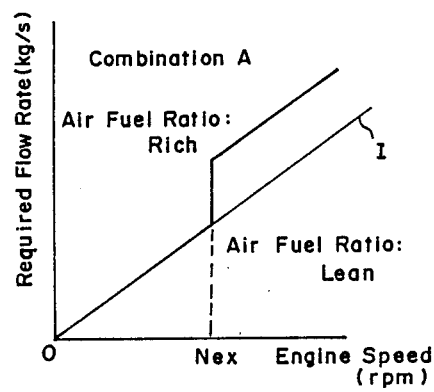
FIG. 19 is a graph showing the relationship between the long intake pipe and the required air flow rate.
Figure 20:
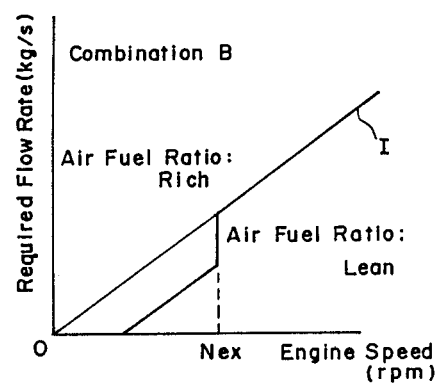
FIG. 20 is a graph showing the relationship between the short intake pipe and the required air flow rate.

FIG. 17 shows the ninth embodiment of the present invention, which is one modification of the eighth embodiment shown in FIG. 11. In this embodiment, the components for the variable intake pipe length means constituted in the former embodiment; i.e., the stationary intake pipe 160, the movable intake pipe 161 and the guide pipe 162 are housed in an air cleaner case 163. The interior of the air cleaner case 163 is separated to make the high speed chamber 165 and the low speed chamber 166 by means of a intake pipe stay 164 supporting the guide pipe 162. The first intake passage 167 is formed in the side wall of the high speed chamber and the second intake passage 168 is formed in the side wall of the low speed chamber, respectively. The diameter of the second intake passage 168 is smaller than that of the first intake passage 167 so that the air flow resistance in the second intake passage 168 is greater than the other.

According to this constitution, as the movable intake pipe 161 connects between the stationary intake pipe 160 and the guide pipe 162 to extend the intake pipe length, the air is introduced from the guide pipe 162 through the second intake passage 168 and thus the air flow resistance is increased. On the other hand, as the movable intake pipe 161 is isolated from the stationary intake pipe 160 to decrease the intake pipe length, and thus the air is introduced from the stationary intake pipe 160 through the first intake passage 167. So that the air flow resistance is decreased. This modified device can also automatically adjust the vacuum pressure level at the main nozzle in the carburetor in response to the switching operation of the intake pipe length in the same manner as the eighth embodiment. Further, this constitution can increase the capacity of the low speed chamber 166 so that it is suitable for a full size car which needs a large quantity of the intake air.

The configuration of the fixed throttle may be varied in addition to that described in the eighth and ninth embodiments. For example, the air duct formed in the air cleaner case may be used and an obstacle plate is arranged at its inlet or in the passage of the air cleaner case so as to restrict the air flow rate. Alternatively, the air duct may be formed in a relatively narrow space so that the air duct per se can be functioned as the throttle section. Further, the diameter of the intake pipe may be varied in response to the pipe length.

The present invention is not only limited to the above described embodiments, but it can also be applied in various configurations. For example, the air cleaner case is not used for the case, but an additional case may be provided. The air flow resistance adjusting means can be embodied by both the variable throttle device such as the shutter as shown in the embodiments and the fixed throttle structure. In the case of employing the fixed throttle structure, a plurality of intake passages having different air flow resistance may be constructed by the interior of the case or many cases per se. Further, these intake passages may be selectively connected to the required intake pipe by suitable switching means such as a valve mechanism.

Although the present invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. An intake device for an internal combustion engine having a variable intake pipe length mechanism which comprises a stationary intake pipe connected to a carburetor, a guide pipe separated from the stationary intake pipe, and a movable intake pipe movably mounted on the guide pipe so as to be capable of being in contact with or spaced from the stationary intake pipe in response to the engine revolving speed, the movable intake pipe being connected to the stationary intake pipe below a predetermined engine speed and separated from it above the predetermined engine speed; wherein the improvement comprises
    a case enclosing the stationary intake pipe, the movable intake pipe and the guide pipe, and having an intake passage communicating with the atmosphere; and
    an air flow resistance adjusting means for varying the air flow resistance into the intake passage in response to the motion of the movable intake pipe.

2. The intake device according to claim 1, wherein the air flow resistance adjusting means comprises a variable throttle mechanism.

3. The intake device according to claim 1 further comprises a variable fuel adjusting mechanism for the carburetor.

4. The intake device according to claim 2, wherein the variable throttle mechanism comprises a shutter arranged at one end of the intake passage opened to the atmosphere, a return spring disposed between the shutter and the open end, and a wire mechanically connected between the shutter and the driving source of the variable intake pipe length mechanism.

5. The intake device according to claim 1, wherein the case is an air cleaner case.

6. The intake device according to claim 4, wherein the shutter is arranged at the open end of the air cleaner case.

7. The intake device according to claim 2, wherein the variable throttle mechanism is a sliding type shutter.

8. The intake device according to claim 2, wherein the variable throttle mechanism is a turning type shutter.

9. The intake device according to claim 5, wherein the air cleaner case is provided with a plurality of intake passages at least one of which is provided with the variable throttle mechanism.

* * * * *